(12) United States Patent
Yanagi et al.

(10) Patent No.: US 7,394,039 B2
(45) Date of Patent: Jul. 1, 2008

(54) KEYBOARD AND MEMBRANE SWITCH FOR KEYBOARD

(75) Inventors: Masahiro Yanagi, Shinagawa (JP); Shigemi Kurashima, Shinagawa (JP); Hideki Iwata, Shinagawa (JP); Takashi Yuba, Shinagawa (JP); Masahiro Kaneko, Shinagawa (JP); Yuriko Segawa, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 103 days.

(21) Appl. No.: 11/543,905

(22) Filed: Oct. 6, 2006

(65) Prior Publication Data
US 2007/0209920 A1  Sep. 13, 2007

(30) Foreign Application Priority Data
Mar. 10, 2006  (JP) .............................. 2006-066441

(51) Int. Cl.
*H01H 1/10* (2006.01)
(52) U.S. Cl. ...................................... 200/512; 200/520
(58) Field of Classification Search ......... 200/512–520; 343/700, 702
See application file for complete search history.

(56) References Cited

U.S. PATENT DOCUMENTS

| | | | |
|---|---|---|---|
| 748,746 A | 1/1904 | Kelsey | |
| 1,187,103 A | 6/1916 | Sagebrecht | |
| 2,012,929 A | 8/1935 | Knowland | |
| 2,114,450 A | 4/1938 | Maclean | |
| 3,002,868 A | 10/1961 | Boivin | |
| 3,247,638 A | 4/1966 | Gay, Jr. | |
| 3,309,259 A | 3/1967 | Schwrtz | |
| 3,322,607 A | 5/1967 | Jung | |
| 3,325,323 A | 6/1967 | Forkner | |
| 3,360,421 A | 12/1967 | Sands | |
| 3,414,458 A | 12/1968 | Lacy | |
| 3,522,637 A | 8/1970 | Brumlik | |
| 3,574,019 A | 4/1971 | Girard | |
| 3,583,057 A | 6/1971 | Kolozsvary | |
| 3,708,833 A | 1/1973 | Ribich et al. | |
| 3,711,349 A | 1/1973 | Snyder et al. | |
| 3,712,845 A | 1/1973 | Hartung | |
| 3,735,988 A | 5/1973 | Palmer et al. | |
| 3,775,856 A | 12/1973 | Schmidt | |
| 3,817,015 A | 6/1974 | Frangos | |
| 3,849,840 A | 11/1974 | Yamada et al. | |
| 3,866,267 A | 2/1975 | Poletti | |
| 4,093,763 A | 6/1978 | Hartmann et al. | |
| 4,096,302 A | 6/1978 | Thibodeau et al. | |

(Continued)

FOREIGN PATENT DOCUMENTS

AU    40926/72    10/1973

(Continued)

*Primary Examiner*—Michae A Friedhofer
*Assistant Examiner*—Lisa N Klaus
(74) *Attorney, Agent, or Firm*—Staas & Halsey LLP

(57) ABSTRACT

A disclosed keyboard includes a housing with a base member, a top plane member, and a membrane switch installed inside the housing. The membrane switch has a first resin sheet, a second resin sheet, and a spacer resin sheet arranged between the first and second resin sheets. The membrane switch includes a UWB flat antenna that has an antenna element pattern formed on the first resin sheet, a microwave transmission line extending from the antenna element pattern, and a ground pattern arranged in a position facing the antenna element pattern.

10 Claims, 10 Drawing Sheets

U.S. PATENT DOCUMENTS

| | | | |
|---|---|---|---|
| 4,172,166 A | 10/1979 | Hartmann et al. |
| 4,210,690 A | 7/1980 | Hartmann et al. |
| 4,342,802 A | 8/1982 | Pickens, Jr. et al. |
| 4,389,443 A | 6/1983 | Thomas et al. |
| 4,390,582 A | 6/1983 | Pickens, Jr. et al. |
| 4,391,866 A | 7/1983 | Pickens, Jr. et al. |
| 4,405,668 A | 9/1983 | Wald |
| 4,412,877 A | 11/1983 | Vosburgh |
| 4,489,115 A | 12/1984 | Layman et al. |
| 4,522,857 A | 6/1985 | Higgins |
| 4,528,783 A | 7/1985 | Muir |
| 4,557,774 A | 12/1985 | Hoopengardner |
| 4,578,910 A | 4/1986 | Germeroth et al. |
| 4,622,253 A | 11/1986 | Levy |
| 4,649,069 A | 3/1987 | Tone |
| 4,671,976 A | 6/1987 | Vidal |
| 4,673,603 A | 6/1987 | Roth |
| 4,697,294 A | 10/1987 | Schafer |
| 4,755,401 A | 7/1988 | Friedrich et al. |
| 4,758,457 A | 7/1988 | Altus |
| 4,766,022 A | 8/1988 | Tone |
| 4,769,895 A | 9/1988 | Parkins |
| 4,770,917 A | 9/1988 | Tochacek et al. |
| 4,797,170 A | 1/1989 | Hoopengardner |
| 4,810,546 A | 3/1989 | McLaughlin |
| 4,822,658 A | 4/1989 | Pacione |
| 4,824,498 A | 4/1989 | Goodwin et al. |
| 4,825,477 A | 5/1989 | Aranda |
| 4,829,627 A | 5/1989 | Altus et al. |
| 4,870,725 A | 10/1989 | Dubowik |
| 4,898,417 A | 2/1990 | Kudo |
| 4,921,742 A | 5/1990 | Altus |
| 4,968,548 A | 11/1990 | Gibson et al. |
| 4,974,384 A | 12/1990 | Pacione |
| 5,042,221 A | 8/1991 | Pacione |
| 5,045,389 A | 9/1991 | Campagna |
| 5,060,443 A | 10/1991 | Pacione |
| 5,116,439 A | 5/1992 | Raus |
| 5,133,166 A | 7/1992 | Pacione |
| 5,144,786 A | 9/1992 | Pacione |
| 5,149,573 A | 9/1992 | Kobe et al. |
| 5,191,692 A | 3/1993 | Pacione |
| 5,199,141 A | 4/1993 | Trask et al. |
| 5,200,245 A | 4/1993 | Brodrick, Jr. |
| 5,216,790 A | 6/1993 | Eschenbach |
| 5,219,647 A | 6/1993 | Vock et al. |
| 5,259,163 A | 11/1993 | Pacione |
| 5,324,562 A | 6/1994 | Mullinax et al. |
| 5,382,462 A | 1/1995 | Pacione |
| 5,386,670 A | 2/1995 | Takeda |
| 5,398,347 A | 3/1995 | Luedtke et al. |
| 5,479,755 A | 1/1996 | Pacione |
| 5,482,755 A | 1/1996 | Manning |
| 5,529,825 A | 6/1996 | Sutherland |
| 5,537,793 A | 7/1996 | Murasaki |
| 5,654,066 A | 8/1997 | Pacione |
| 5,672,404 A | 9/1997 | Callahan et al. |
| 5,691,026 A | 11/1997 | Zinke et al. |
| 5,691,027 A | 11/1997 | Eckhardt et al. |
| 5,693,171 A | 12/1997 | Foster et al. |
| 5,723,195 A | 3/1998 | Pacione |
| 5,753,336 A | 5/1998 | Stull |
| 5,804,273 A | 9/1998 | Drake et al. |
| 5,832,619 A | 11/1998 | Volkema, Jr. |
| 5,863,637 A | 1/1999 | Mansson et al. |
| 5,879,777 A | 3/1999 | Shipley |
| 5,902,663 A | 5/1999 | Justesen et al. |
| 5,965,232 A | 10/1999 | Vinod |
| 5,980,230 A | 11/1999 | Dowd et al. |
| 6,083,596 A | 7/2000 | Pacione |
| 6,158,185 A | 12/2000 | Counihan |
| 6,182,414 B1 | 2/2001 | Huang |
| 6,203,881 B1 | 3/2001 | Higgins |
| 6,217,974 B1 | 4/2001 | Pacione |
| 6,250,001 B1 | 6/2001 | Gillespie |
| 6,298,624 B1 | 10/2001 | Pacione |
| 6,306,477 B1 | 10/2001 | Pacione |
| 6,395,362 B1 | 5/2002 | Pacione |
| 6,460,303 B1 | 10/2002 | Pacione |
| 6,526,704 B1 | 3/2003 | Berard et al. |
| 6,586,066 B1 | 7/2003 | Buckwalter et al. |
| 6,599,599 B1 | 7/2003 | Buckwalter et al. |
| 6,673,177 B2 | 1/2004 | Buckwalter et al. |
| 6,797,353 B1 | 9/2004 | Pacione |
| 6,802,167 B2 | 10/2004 | Pacione |
| 6,850,227 B2 * | 2/2005 | Takahashi et al. ............ 345/169 |
| 7,081,859 B2 * | 7/2006 | Miyoshi et al. .............. 343/767 |
| 7,212,161 B2 * | 5/2007 | Chen et al. ............. 343/700 MS |
| 2003/0143359 A1 | 7/2003 | Daniel et al. |
| 2003/0173201 A1 * | 9/2003 | Ohashi ....................... 200/517 |
| 2006/0109184 A1 * | 5/2006 | Chen et al. .................. 343/702 |
| 2006/0170597 A1 * | 8/2006 | Kurashima et al. .... 343/700 MS |
| 2007/0073935 A1 * | 3/2007 | Kim et al. ...................... 710/62 |
| 2007/0231937 A1 * | 10/2007 | Kurashima et al. ............ 438/17 |
| 2007/0273595 A1 * | 11/2007 | Shimasaki et al. .......... 343/702 |

FOREIGN PATENT DOCUMENTS

| | | |
|---|---|---|
| BE | 853 033 | 7/1977 |
| DE | 7 029 524 | 11/1970 |
| DE | 2 012 523 | 2/1972 |
| DE | 2 201 231 | 7/1973 |
| DE | 2 245 915 | 4/1974 |
| DE | 2 803 006 | 8/1979 |
| DE | 42708 | 7/1980 |
| DE | 4 228 597 | 3/1994 |
| DE | 195 32 685 | 3/1997 |
| DE | 197 24 698 | 12/1998 |
| EP | 0 321 978 | 10/1979 |
| EP | 0 161 637 | 11/1985 |
| EP | 0 281 332 | 9/1988 |
| EP | 0 325 473 | 7/1989 |
| EP | 0 455 926 | 12/1990 |
| EP | 0 860 543 | 8/1998 |
| EP | 1775741 A1 * | 4/2007 |
| FR | 2 328 432 | 5/1977 |
| FR | 2 362 257 | 3/1978 |
| FR | 2 582 210 | 11/1986 |
| GB | 1 006 599 | 10/1965 |
| GB | 1 204 886 | 9/1970 |
| GB | 1 376 262 | 12/1973 |
| GB | 1 546 901 | 5/1979 |
| JP | 48-112114 | 12/1973 |
| JP | 53-74719 | 7/1978 |
| JP | 56-27210 | 3/1981 |
| JP | 57-011279 | 1/1982 |
| JP | 59-81479 | 6/1984 |
| JP | 61-62135 | 4/1986 |
| JP | 02-088015 | 3/1990 |
| JP | 10-118988 | 5/1998 |
| JP | 2003-131792 | 5/2003 |
| WO | WO 86/01247 | 2/1986 |
| WO | WO 92/08017 | 5/1992 |
| WO | WO 94/00043 | 1/1994 |
| WO | WO 95/03723 | 2/1995 |
| WO | WO 95/32654 | 12/1995 |
| WO | WO 96/41913 | 12/1996 |
| WO | WO 98/03104 | 1/1998 |
| WO | WO 99/35943 | 1/1999 |
| WO | WO 99/35944 | 7/1999 |
| WO | WO 00/74544 | 12/2000 |
| WO | WO 01/81771 | 11/2001 |

* cited by examiner

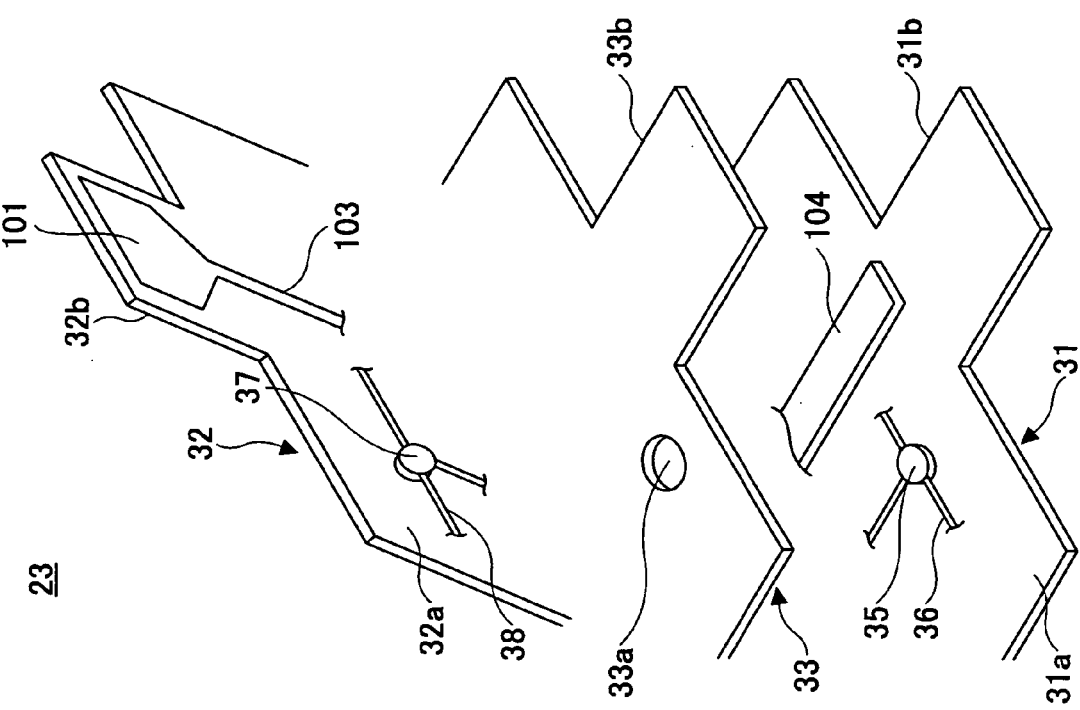
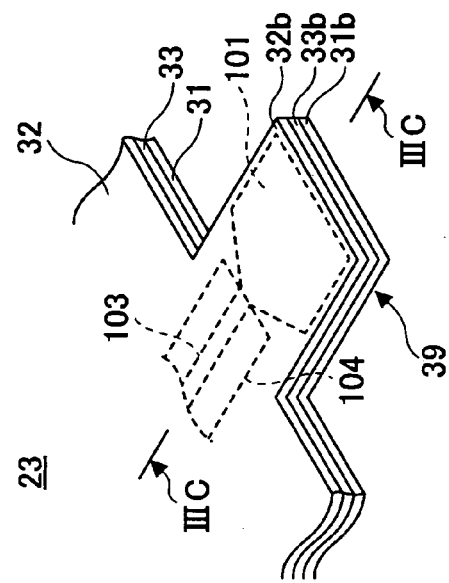
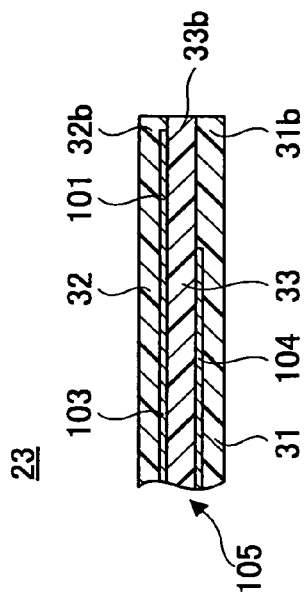

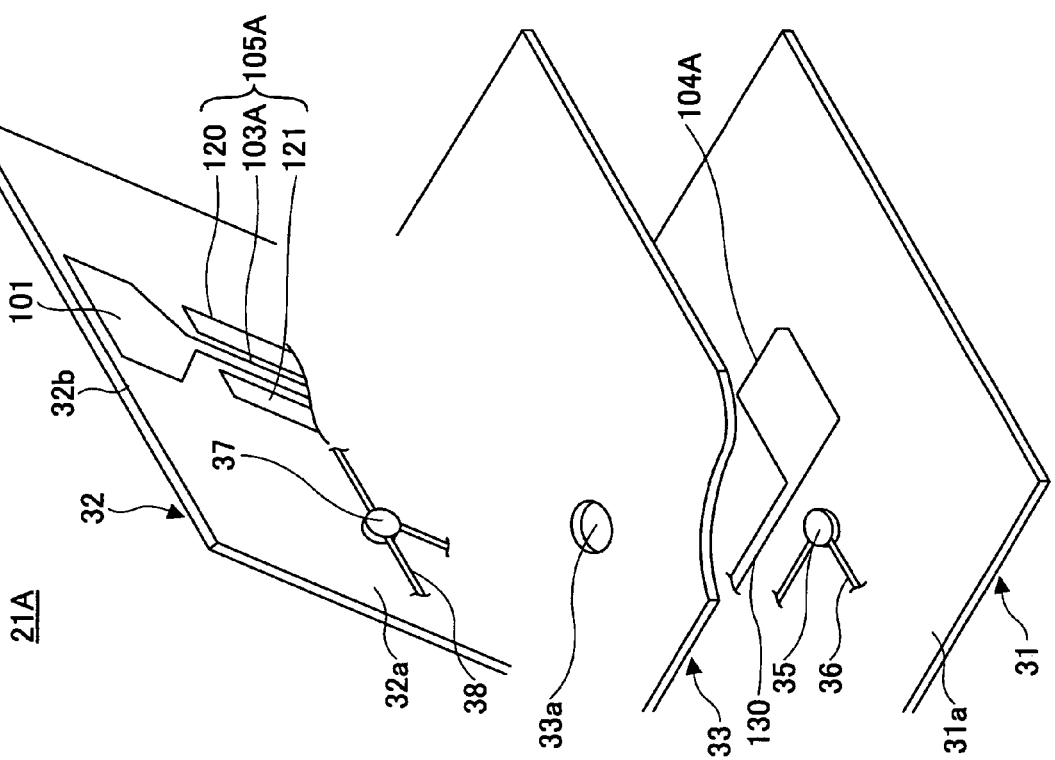
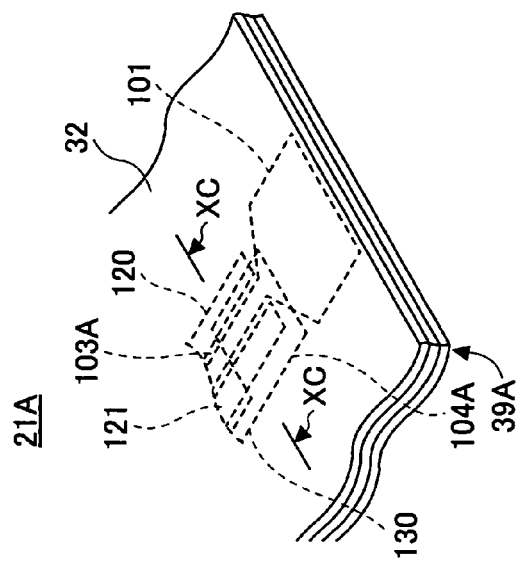
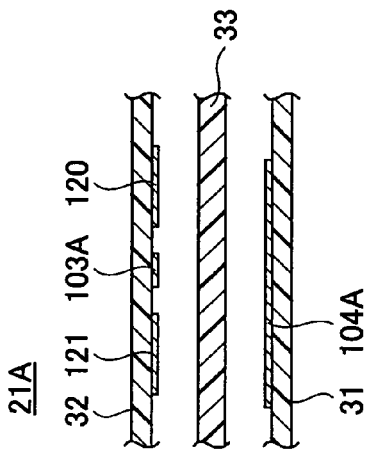

KEYBOARD AND MEMBRANE SWITCH FOR KEYBOARD

BACKGROUND OF THE INVENTION

1. Field of the Invention

The present invention generally relates to a keyboard and a membrane switch for a keyboard, and more particularly to, for example, a wireless type keyboard and a membrane switch for a wireless type keyboard.

2. Description of the Related Art

Keyboards which are used as input devices for computers include a type having a keyboard connected to a computer with a cord or the like and a wireless type having, for example, a built-in transmission circuit and an antenna for performing wireless communications with a computer.

The wireless type keyboards have different transmission distances depending on the transmission circuit of the wireless keyboard. For example, there are long distance type wireless keyboards transmitting data (signals) at long distances (e.g. several tens of meters) and short distance type wireless keyboards transmitting data (signals) at short distances (e.g. no more than ten meters). The long distance type wireless keyboards are mainly used outdoors and the short distance type wireless keyboards are mainly used indoors (e.g. inside the house or office).

The conventional short distance type wireless keyboard uses radio waves in a narrow bandwidth and has a center frequency of approximately 300 MHz. The short distance type wireless keyboard includes a rod-shaped antenna. Since the rod-shaped antenna occupies a large amount of the small space inside the keyboard, only a single antenna can be installed in the keyboard.

The conventional short distance type wireless keyboard has two problems. The first problem is that the data transmission speed is insufficient due to the narrow bandwidth of the radio waves. The second problem is that fading may be caused by the environment surrounding the keyboard since only a single antenna can be installed in the keyboard. This results in low reliability in the data transmission from the keyboard to the main body of the computer.

SUMMARY OF THE INVENTION

The present invention may provide a keyboard and a membrane switch for a keyboard that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a keyboard and a membrane switch for a keyboard particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a keyboard including: a housing including a base member and a top plane member; a membrane switch installed inside the housing, the membrane switch having a first resin sheet, a second resin sheet, and a spacer resin sheet arranged between the first and second resin sheets; wherein the membrane switch includes a UWB flat antenna having an antenna element pattern formed on the first resin sheet, a microwave transmission line extending from the antenna element pattern, and a ground pattern arranged in a position facing the antenna element pattern.

In the keyboard according to an embodiment of the present invention, the microwave transmission line may include a microstrip line type microwave transmission line.

In the keyboard according to an embodiment of the present invention, the microwave transmission line may include a coplanar line type microwave transmission line.

In the keyboard according to an embodiment of the present invention, the spacer resin sheet may have a relative dielectric constant higher than that of the first and second resin sheets.

In the keyboard according to an embodiment of the present invention, the keyboard may further include: plurality of the UWB flat antennas formed in the membrane switch.

In the keyboard according to an embodiment of the present invention, the plural UWB flat antennas may be oriented in different directions.

In the keyboard according to an embodiment of the present invention, the first resin sheet, the second resin sheet, and the spacer resin sheet may each have a protruding part protruding in an outward direction, wherein the protruding part of the first resin sheet, the second resin sheet, and the spacer resin sheet are superposed on each other.

In the keyboard according to an embodiment of the present invention, the superposed protruding parts may be bent in a direction orthogonal to the membrane switch.

Furthermore, the present invention provides a keyboard including: a housing including a base member and a top plane member; a membrane switch installed inside the housing, the membrane switch having a UWB flat antenna including an antenna element pattern, a microstrip line extending from the antenna element pattern, and a ground pattern arranged in a position facing the antenna element pattern; wherein the UWB flat antenna is a flexible sheet adhered to a part inside the housing; wherein the flexible sheet has a front surface on which the antenna element pattern and the microstrip line are formed and a rear surface on which the ground pattern is formed.

Furthermore, the present invention provides a membrane switch used for a keyboard having a housing into which the membrane switch is installed, the membrane switch including: a first resin sheet, a second resin sheet, and a spacer resin sheet arranged between the first and second resin sheets; wherein the membrane switch includes a UWB flat antenna having an antenna element pattern formed on the first resin sheet, a microwave transmission line extending from the antenna element pattern, and a ground pattern arranged in a position facing the antenna element pattern.

Other objects and further features of the present invention will be apparent from the following detailed description when read in conjunction with the accompanying drawings.

BRIEF DESCRIPTION OF THE DRAWINGS

FIG. 3A is a schematic diagram of a UWB flat antenna according to an embodiment of the present invention;

FIG. 3B is another schematic diagram of a UWB flat antenna according to an embodiment of the present invention;

FIG. 3C is a cross-sectional view taken along line IIIC-IIIC of FIG. 3B;

FIG. 10A is a schematic diagram of a UWB flat antenna according to yet another embodiment of the present invention;

FIG. 10B is another schematic diagram of a UWB flat antenna according to yet another embodiment of the present invention;

FIG. 10C is a cross-sectional view taken along line XC-XC of FIG. 10B; and

DESCRIPTION OF THE PREFERRED EMBODIMENTS

In the following, embodiments of the present invention are described with reference to the accompanying drawings.

First Embodiment

Figure 1:
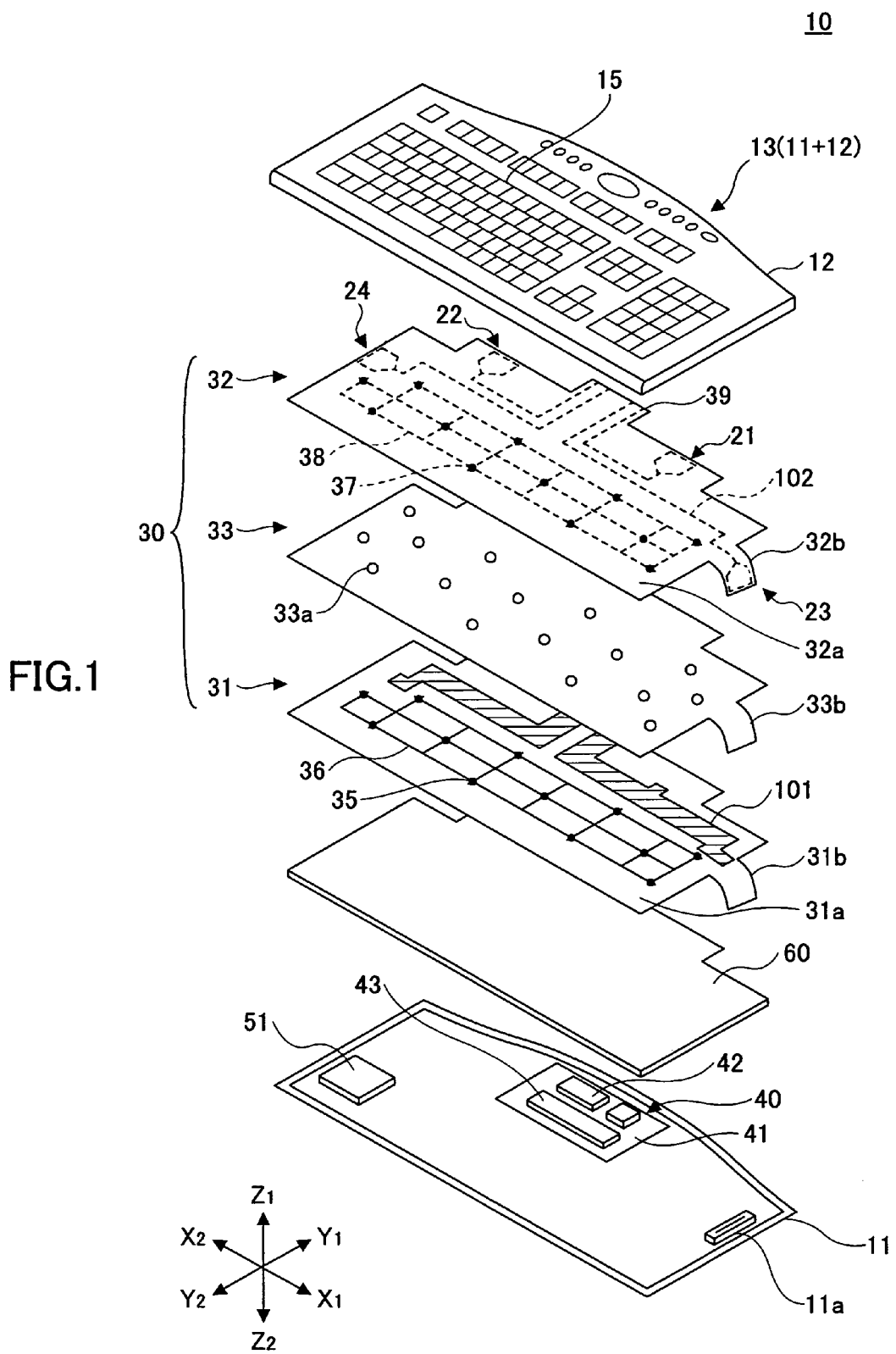
FIG. 1 is a perspective exploded view showing a keyboard according to an embodiment of the present invention.

FIG. 1 is an exploded perspective view showing a wireless type keyboard (hereinafter also simply referred to as "keyboard") 10 according to a first embodiment of the present invention.

The keyboard 10 has plural planar UWB (Ultra Wide Band) flat antennas (in this example, four antennas) 21-24 installed therein. The UWB flat antennas 21-24 form a united body with a membrane switch 30. With reference to FIG. 1, the directions X1-X2 indicate the right and left directions, respectively, from the viewpoint of the user of the keyboard 10, the directions Y1-Y2 indicate the rear and front directions, respectively, from the viewpoint of the user of the keyboard 10 (width direction of the keyboard 10), and the directions Z1-Z2 indicate the height directions from the viewpoint of the user of the keyboard 10 (thickness direction of the keyboard 10).

Figure 5A:
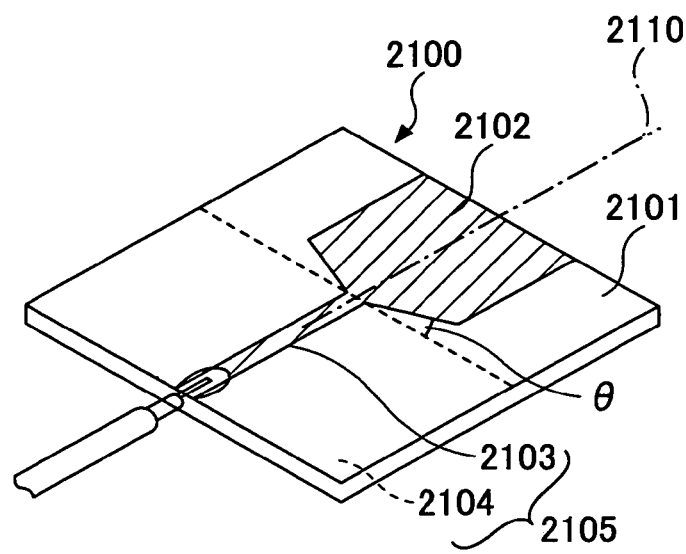
FIGS. 5A-5B are schematic diagrams showing a configuration of a UWB flat antenna.
Figure 5B:
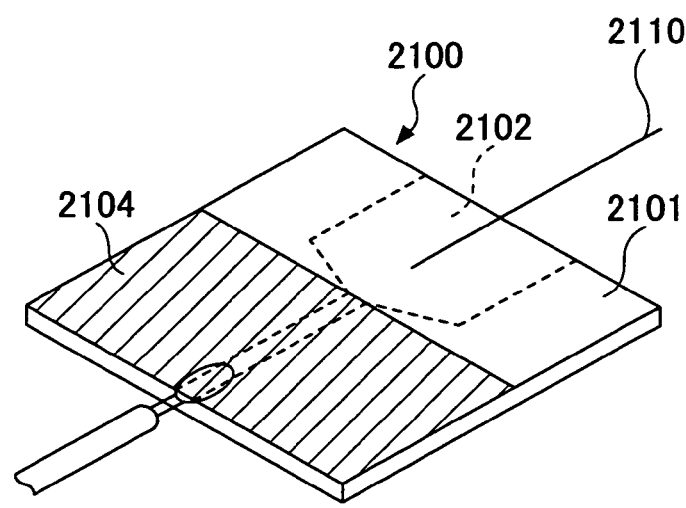

A basic configuration of a UWB flat antenna 2100 is described with reference to FIGS. 5A and 5B (as disclosed in Japanese Patent Application No. 2005-378396 filed by the applicant of this application). The UWB flat antenna 2100 includes a dielectric plate 2101. A front face of the dielectric plate 2101 is formed with an antenna element pattern (in this example, shaped as a home plate) 2102 and a conductor (in this example, shaped as a strip, hereinafter referred to as "strip conductor") 2103 extending from the antenna element pattern 2102. A rear face of the dielectric plate 2101 is formed with a ground pattern 2104 at a portion facing the strip conductor 2103. The ground pattern 104 and the antenna element pattern 2102 are arranged in a manner so that their edge parts do not overlap with each other. The strip conductor 2103 and the ground pattern 2104 are arranged in a manner facing each other with the dielectric plate 2101 disposed therebetween. Thereby, the strip conductor 2103 and the ground pattern 2104 form a microstrip line type microwave transmission line 2105 of 50 Ω. The microwave transmission line 2105 is configured to transmit a microwave(s). Thus, the UWB flat antenna 2100 has a configuration including the antenna element pattern 2102, the ground pattern 2104, and the microwave transmission line 2105. The UWB flat antenna 2100 provides a desired characteristic in accordance with the angle θ formed by a side of the antenna element pattern 2102 facing the ground pattern 2104 (See FIG. 5A). The ground pattern 2104 is configured to be a ground potential part in the vicinity of the antenna element pattern 2102 so that electric lines of force can be formed surrounding the antenna element pattern 2102. In addition, the ground pattern 2104 is configured to be a part of the microwave transmission line 2105 by being arranged facing the strip conductor 2103 with the dielectric plate 2101 disposed therebetween. In FIGS. 5A and 5B, reference numeral 2110 indicates the axis of the UWB flat antenna 2100.

Figure 6:
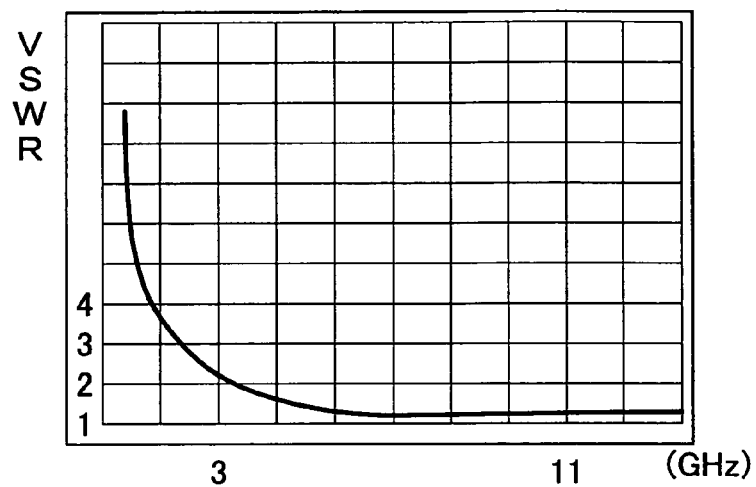
FIG. 6 is a graph showing a relationship of VSWR and frequency of a UWB flat antenna according to an embodiment of the present invention.

The frequency of the UWB flat antenna 100 with respect to VSWR (Voltage Standing Wave Ratio) is shown in FIG. 6. In the example shown in FIG. 6, the frequency ranges from 3.1 to 10.6 GHz and the VSWR is no greater than 1.4. Furthermore, the UWB flat antenna 100 has directivity oriented in a periphery direction centered on its axis 110.

As shown in FIG. 1, the keyboard 10 includes a base member 11 and a top plane member 12 that are assembled to form a housing. The membrane switch 30 including the UWB flat antennas 21-24, a membrane switch supporting plane 60, and a keyboard circuit module that has a wireless transmission function 40 (hereinafter simply referred to as "keyboard circuit module 40") are provided inside the space created by assembling the base member 11 and the top plane member 12 together.

The top plane member 12 has numerous key tops 10 arranged thereon.

The membrane switch 30 has a layered structure including a spacer resin sheet 33 provided between a lower resin sheet 31 and an upper resin sheet 32. As shown in FIGS. 1 and 3A, a lower contact part(s) 35 and a lower wiring pattern(s) 36 are formed on an upper surface 31a of the lower resin sheet 31 according to the first embodiment of the present invention. Furthermore, an upper contact part(s) 37 and an upper wiring pattern(s) 38 are formed on a lower surface 32a of the upper resin sheet 32 according to the first embodiment of the present invention. In this example, the upper and lower contact parts 35, 37 and the upper and lower wiring patterns 36, 38 are printed on the upper surface 31a of the lower resin sheet 31, and the lower surface 32a of the upper resin sheet 32, respectively. The upper contact part 35 and the lower contact part 37 are positioned facing each other. An opening 33a is formed in the spacer resin sheet 33 at the part where the upper and lower contact parts 35, 37 face each other (See FIG. 3A). In this example, both the lower resin sheet 31 and the upper resin sheet 32 are formed of a polyethylene terephthalate (PET) material. Since the spacer resin sheet 33 serves as a part of the UWB flat antennas 21-24, the spacer resin sheet 33 is formed of a liquid crystal polymer material. Reference numeral 39 in FIGS. 1 and 3B indicates an edge contact group portion including an arrangement (group) of contact parts allocated at or in the vicinity of the edges of the wiring patterns 36, 38, a contact part allocated at or in the vicinity of the edges of the strip conductor 103, and a contact part allocated at or in the vicinity of the edges of the ground pattern 104.

As shown in FIG. 1, the keyboard circuit module 40 and a battery 51 are provided on an upper face of the base member 11. The keyboard circuit module 40 includes a printed circuit board 41 on which a connector 42 and an electronic component 43 are mounted. The connector 42 is configured to be connected to or contact the edge contact group portion 39. In this example, the battery 51 is a replaceable battery. Furthermore, the base member 11 has an insertion part 11a which is integrally formed as a united body with the base member 51 (See FIG. 4)

The membrane switch supporting plane 60 is fixed to the base member 11 in a manner that covers the keyboard circuit module 40.

The membrane switch 30 including the UWB flat antennas 21-24 is mounted on the membrane switch supporting plane 60. Connection between the membrane switch 30 and the keyboard circuit module 40 is established by having the edge contact group portion 39 (in this example, the edge contact group portion 39 extends in the Y1 direction) bent in the Z2 direction and inserted into the connector 42. That is, the edge contact group portion 39 is bent in a direction orthogonal to the plane of the membrane switch 30 and inserted into the connector 42.

Next, the configuration of the UWB flat antennas 21-24 that are integrally formed (i.e. formed as a united body) with the membrane switch 30 is described in further detail.

Figure 2:
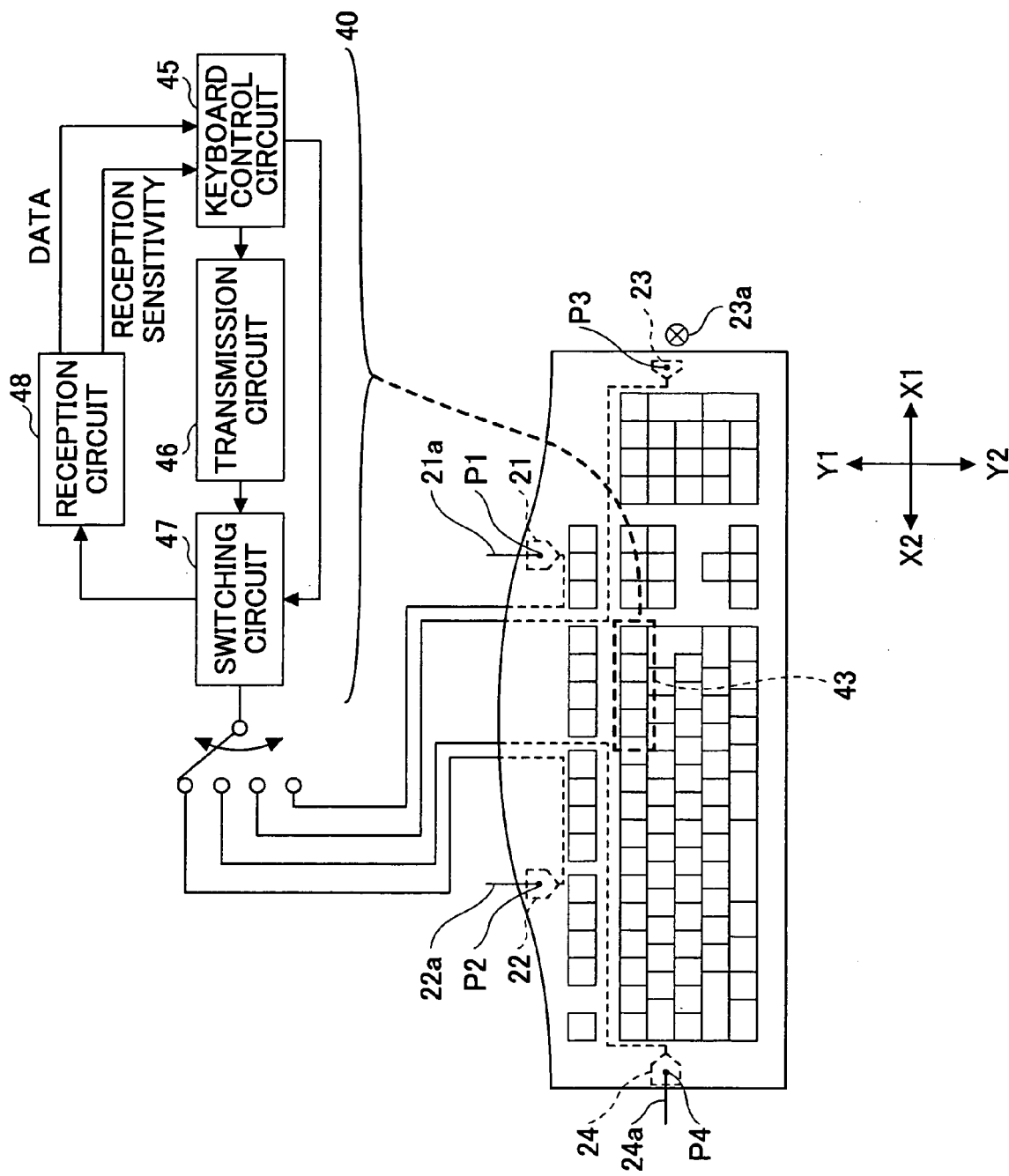
FIG. 2 is a schematic diagram of a keyboard shown in relation to a block diagram of a module of a wireless function keyboard circuit according to an embodiment of the present invention.

As shown in FIGS. 1 and 2, the UWB flat antennas 21-24 are integrally formed with the membrane switch 30. The UWB flat antennas 21-24 are separately positioned in various parts of the membrane switch 30. Since the flat antennas 21-24 are of an UWB (Ultra Wide Band) type, the flat antennas 21-24 can transmit data several times faster than conventional antennas. In FIG. 2, the UWB flat antenna 21 is situated at a part along the edge of the membrane switch 30 toward direction Y1, more specifically, at a position P1 on the X1 side of the membrane switch 30. The UWB flat antenna 22 is situated at a part also along the edge of the membrane switch 30 toward direction Y1, more specifically, at a position P2 on the X2 side of the membrane switch 30. The UWB flat antenna 23 is situated at a part along the edge of the membrane switch 30 toward direction X1, more specifically, at a position P3 on the X1 side of the membrane switch 30. The UWB flat antenna 24 is situated at a part along the edge of the membrane switch 30 toward direction X2, more specifically, at a position P4 on the side X2 of the membrane switch 30.

The configuration of the UWB flat antenna 23 is illustrated more specifically in FIGS. 3A-3C. As shown in FIG. 3A, the UWB flat antenna 23 has an antenna element pattern 101 formed on a protruding part 32b of the lower surface 32a of the upper resin sheet 32. The strip conductor 103 of the UWB flat antenna 23 extends from a base part of the antenna element pattern 101 of the upper resin sheet 32 and has its distal end reaching the edge contact group portion 39 at the extended part of the lower surface 32a of the upper resin sheet 32. Protruding parts 31b and 33b are respectively formed in the lower resin sheet 31 and the spacer resin sheet 33 in correspondence with the protruding part 32b of the upper resin sheet 32. A belt-like ground pattern 104 is formed on the upper surface of the lower resin sheet 31 along the strip conductor 103 of the upper resin sheet 32. The strip conductor 103, the ground pattern 104, and the spacer resin sheet 33 disposed therebetween form the microstrip linear type microwave transmission line 105 of 50 Ω. The antenna element pattern 101 and the strip conductor 103 are formed simultaneously with the contact part 37 and the wiring pattern 38. In this example, the antenna element pattern 101 and the strip conductor 103 as well as the contact part 37 and the wiring pattern 38 are printed simultaneously on the upper resin sheet 32. Furthermore, the ground pattern 104 is printed simultaneously with the contact part 35 and the wiring pattern 36 on the lower resin sheet 31. The ground pattern 104 is extended so that its distal end reaches the edge contact group portion 39. A part of the belt-like ground pattern 104 situated in the vicinity of the antenna element pattern 101 (toward direction X1) is a ground potential part for forming electric lines of force that surround the antenna element pattern 101. The remaining part of the ground pattern 104 serves as part of the microwave transmission line 105.

Figure 4:
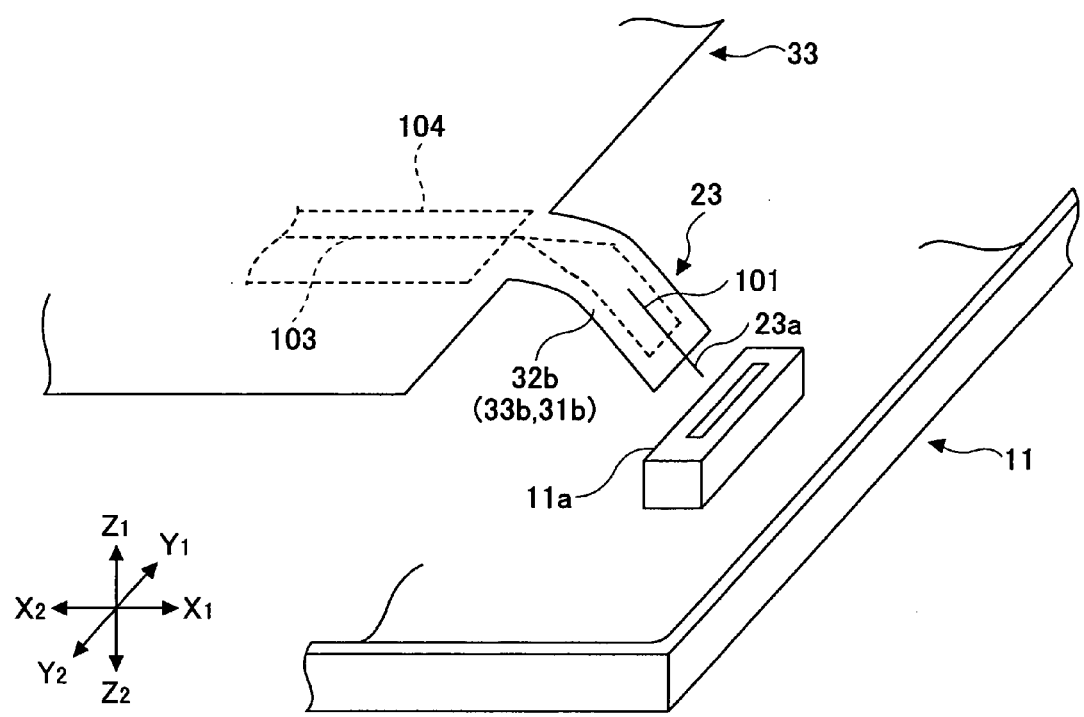
FIG. 4 is a schematic diagram for describing a UWB flat antenna being fixed to a base material by bending a tip of a UWB flat antenna and inserting the tip in an insertion part according to an embodiment of the present invention.

As shown in FIGS. 3B and 3C, the UWB flat antenna 23 is configured with the protruding parts 31b, 32b, and 33b superposed on each other. When the UWB flat antenna 23 is fixed (See FIG. 4), the UWB flat antenna 23 has a configuration mainly including the antenna element pattern 101, the strip conductor 103, the ground pattern 104, and the protruding part 33b of the spacer resin sheet 33 between the strip conductor 103 and the ground pattern 104. That is, from a schematic view point, the UWB flat antenna 23 includes the antenna element pattern 101, the part of the ground pattern 104 situated toward the antenna element pattern 101, and the microwave transmission line 105. As shown in FIG. 4, the UWB flat antenna 23 is fixed, for example, to the base member 11 by being bent toward the Z2 direction and having its distal end inserted into the insertion part 11a.

The protruding part 33b, which is part of the spacer resin sheet 33, corresponds to the dielectric plate 2101 shown in FIGS. 5A and 5B. Accordingly, the UWB flat antenna 23 can utilize the parts of the membrane switch 30 instead of having to employ an additional component that functions as a dielectric plate. The spacer resin sheet 33 is, for example, formed of a liquid crystal polymer material. The spacer resin sheet 33 formed of liquid crystal polymer material has a relative dielectric constant of approximately 10. Accordingly, the relative dielectric constant of the spacer resin sheet 33 formed of liquid crystal polymer material is considerably higher than that in a case of using polyethylene terephthalate (approximately 3). Therefore, the size of the antenna element pattern 102 of the UWB flat antenna 23 can be reduced to thereby achieve size reduction of the UWB flat antenna 23. Hence, the UWB flat antenna can be satisfactorily disposed inside the main body of the keyboard 13.

The other UWB flat antennas 21, 22, and 24 also utilize the parts situated in the vicinity of the respective edges of the upper resin sheet 32, the spacer resin sheet 33, and the lower resin sheet 31 in the same manner as the above-described UWB flat antenna 23. It is however to be noted that the other UWB flat antennas 21, 22, and 24 are not bent as the UWB flat antenna 23 but maintain a planar state parallel to the plane of the membrane switch 33.

As described above, the UWB flat antennas 21-24 are allocated in various parts of the membrane switch 30. Furthermore, the axes of the UWB flat antennas 21-24 are oriented in different directions. That is, the UWB flat antennas 21, 22 have their axes 21a, 22a oriented in the Y1 direction (See FIG. 2), the UWB flat antenna 24 has its axis 24a oriented in the X2 direction (See FIG. 2), and the UWB flat antenna 23 has its axis 23a oriented in the Z2 direction (See FIG. 4). Accordingly, regardless of the conditions surrounding the keyboard 10, satisfactory communications sensitivity including reception sensitivity and/or transmission sensitivity can be attained with at least one of the UWB flat antennas 21-24 with their axes oriented in different directions.

The UWB flat antennas 21-24 may also have a patterned filter provided in a middle section of the strip conductor 103.

Alternatively, the UWB flat antennas 21-24 may have the antenna element pattern 101 and the strip conductor 103 formed on the upper surface of the lower resin sheet 31, and the ground pattern 104 formed on the lower surface of the upper resin sheet 32.

Next, the keyboard circuit module 40 is described in detail.

As shown in FIG. 2, the keyboard circuit module 40 includes a keyboard control circuit 45, a transmission circuit 46, a switching circuit 47, and a reception circuit 48. The keyboard circuit module 40, which is driven by the battery 51 serving as a power supply, can be used in a frequency bandwidth ranging from 3.1 to 10.6 GHz. The switching circuit 47 switches between the four UWB flat antennas 21-24 according to the signals transmitted from the keyboard control circuit 45. The keyboard control circuit 45 transmits the signals based on reception sensitivity data (described below) of the UWB flat antennas 21-24. The keyboard control circuit 45 transmits the signals so that the UWB flat antenna having the highest reception sensitivity is selected as the UWB flat antenna to be used for communications. The reception circuit 48 transmits reception data of one of the selected UWB flat antennas 21-24 and its reception sensitivity data to the keyboard control circuit 45. Input signals generated in correspondence with the controls of the user operating the keyboard 10 are transmitted from the transmission circuit 46 to one of the UWB flat antennas 21-24 selected by the switching circuit 47.

Next, an example of operating the keyboard 10 according to an embodiment of the present invention is described.

Figure 7:
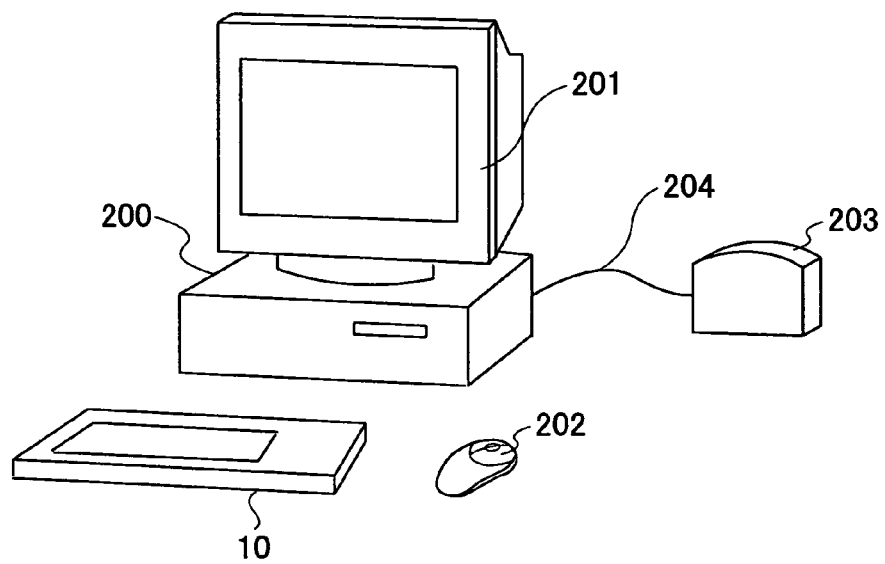
FIG. 7 is a schematic diagram showing a keyboard in use according to an embodiment of the present invention.

FIG. 7 is a schematic diagram showing a keyboard 10 in use (operation) according to an embodiment of the present invention. In FIG. 7, reference numeral 200 indicates a main body of a computer (computer main body), reference numeral 201 indicates a display, reference numeral 202 indicates a mouse, and reference numeral 203 indicates a communications unit. The communications unit 203 also includes a UWB flat antenna and is connected to the computer main body 200.

The keyboard 10 is situated relatively close to the communications unit 203. When the user operates the keyboard 10, input signals corresponding to the operation of the user are transmitted from one of the UWB flat antennas 21-24 by wireless transmission. The communications unit 203 receives the transmitted signal and sends the transmitted signal to the computer main body 200 via the cable 204.

Furthermore, the data in the wireless signal transmitted from the UWB flat antenna of the communications unit 203 are received by the UWB flat antenna having the highest reception sensitivity among the four UWB flat antennas 21-24.

In operating the keyboard 10 according to an embodiment of the present invention, the rate of wireless transmission of data is considerably faster than that of a conventional wireless keyboard since UWB flat antennas are used as the antennas for the wireless transmission. Furthermore, since plural UWB flat antennas (in this example, four antennas) can be mounted in various parts of the keyboard 10 oriented in different directions, problems such as fading can be avoided even when the keyboard 10 is operated in a severe communications environment. As a result, data can be reliably transmitted by using the keyboard 10.

Second Embodiment

Figure 8:
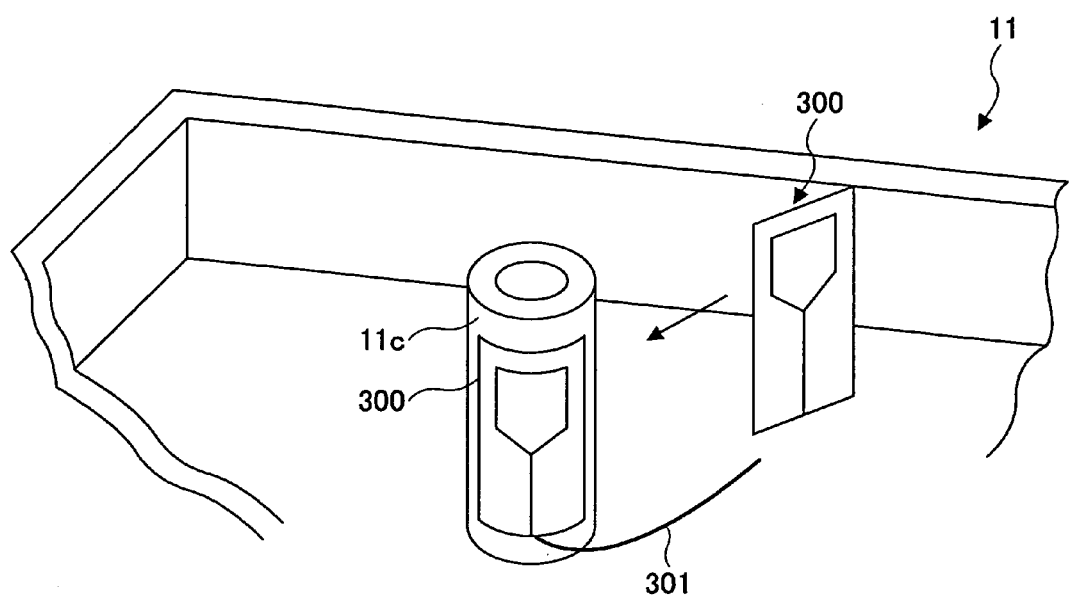
FIG. 8 is a schematic diagram for describing a UWB flat antenna fixed to the inside of a keyboard according to another embodiment of the present invention.

FIG. 8 shows the inside of the keyboard 10 where a UWB flat antenna (in this embodiment, employed as an independent component) 300 is adhered to an inner surface of the keyboard 10 or a surface of a component installed inside the keyboard 10. In this example, the UWB flat antenna 300 is adhered to a peripheral surface of a cylindrical protruding member 11c formed in the base member 11 of the keyboard 10 according to the second embodiment of the present invention. The UWB flat antenna 300 is formed with a flexible resin sheet material instead of, for example, using the plate 2101 formed of a dielectric material shown in FIGS. 5A and 5B. In FIG. 8, reference numeral 301 indicates a coaxial cable.

Third Embodiment

Figure 9:
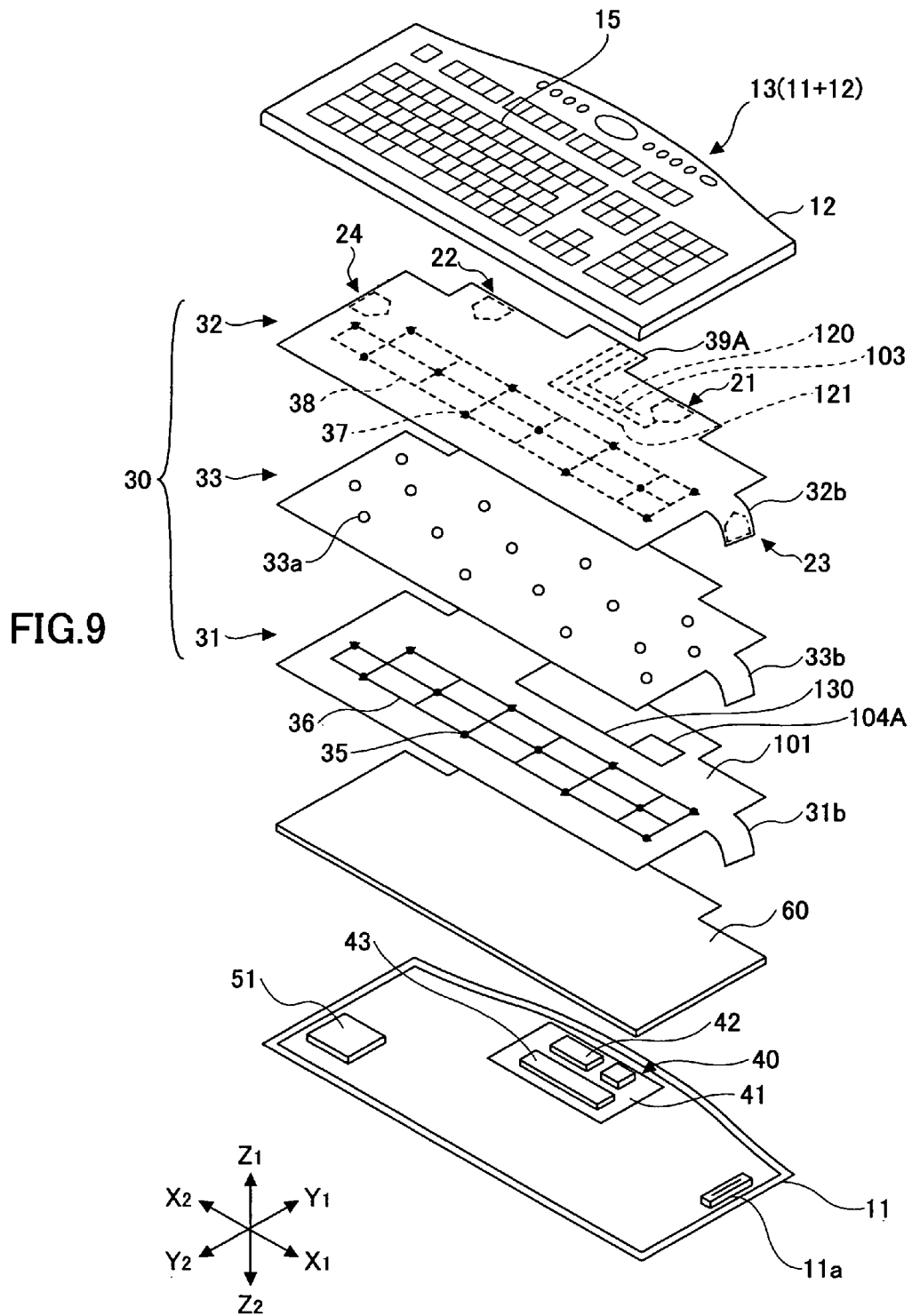
FIG. 9 is a perspective exploded view showing a keyboard according to yet another embodiment of the present invention.

FIG. 9 is an exploded perspective view showing a wireless type keyboard 10 according to a third embodiment of the present invention.

Figure 11:
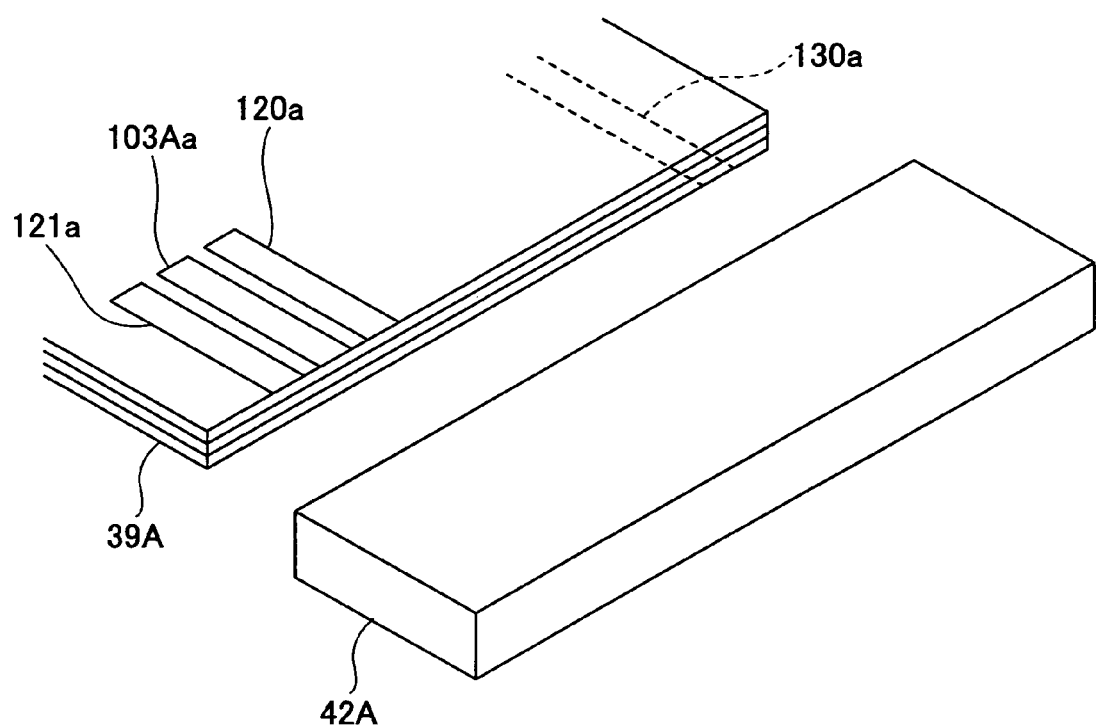
FIG. 11 is a schematic diagram showing a part of a group of edge contacts according to an embodiment of the present invention.

A configuration of a UWB flat antenna 21A according to the third embodiment of the present invention is show in FIGS. 10A-10C. FIG. 11 is a schematic diagram showing an edge contact group portion 39A facing a connector 42A according to the third embodiment of the present invention. It is to be noted that like components are denoted with like reference numerals as those of the first and second embodiments of the present invention and are not described further in detail.

The keyboard 10A of the third embodiment is different from the keyboard 10 of the first embodiment in that the microwave transmission line 105A of the UWB flat antenna 21A is a coplanar line type microwave transmission line.

The UWB flat antenna 21A includes, for example, the antenna element pattern 101, a strip conductor 103A, ground conductor line parts 120, 121, a ground pattern 104A, and a ground conductor line 130.

The ground conductor line parts 120, 121 are aligned in parallel with the strip conductor 103A one on each side of the strip conductor 103A. In this embodiment, the strip conductor 103A and the ground conductor line parts 120, 121 form a microwave transmission line 105A of 50 Ω. The strip conductor 103A, the ground conductor line parts 120, 121 are formed on the lower surface 32a of the upper resin sheet 32. Thereby, the microwave transmission line 105A is configured as a coplanar line type microwave transmission line.

A square-shaped ground pattern 104A and a ground conductor line 130 extending from the square-shaped ground pattern 104A are formed on the upper surface 31a of the lower resin sheet 31.

As shown in FIG. 11, the edge contact group portion 39A has a contact part 103Aa of the strip conductor 103A, a contact part 120a of the ground conductor line 120, and a contact part 121a of the ground conductor line 121 aligned on the same plane. Accordingly, the connector 42A, which is to be connected to the edge contact group portion 39A, can be formed with a simple configuration due to the coplanar alignment of the contact parts. Thereby, the edge contact group portion 39A can be easily connected to the connector 42A. It is to be noted that numeral 130a of FIG. 11 indicates a contact part of the ground conductor line 130 according to the third embodiment of the present invention.

Although not shown in FIG. 9, the microwave transmission lines of other UWB flat antennas 22-24 according to the third embodiment of the present invention are also coplanar type microwave transmission lines.

Further, the present invention is not limited to these embodiments, but variations and modifications may be made without departing from the scope of the present invention.

The present application is based on Japanese Priority Application No. 2006-066441 filed on Mar. 10, 2006, with the Japanese Patent Office, the entire contents of which are hereby incorporated by reference.

What is claimed is:

1. A keyboard comprising:
   a housing including a base member and a top plane member;
   a membrane switch installed inside the housing, the membrane switch having a first resin sheet, a second resin sheet, and a spacer resin sheet arranged between the first and second resin sheets;
   wherein the membrane switch includes a UWB flat antenna having an antenna element pattern formed on the first resin sheet, a microwave transmission line extending from the antenna element pattern, and a ground pattern arranged in a position facing the antenna element pattern.

2. The keyboard as claimed in claim 1, wherein the microwave transmission line includes a microstrip line type microwave transmission line.

3. The keyboard as claimed in claim 1, wherein the microwave transmission line includes a coplanar line type microwave transmission line.

4. The keyboard as claimed in claim 1, wherein the spacer resin sheet has a relative dielectric constant higher than that of the first and second resin sheets.

5. The keyboard as claimed in claim 1, further comprising:
   plural of the UWB flat antennas formed in the membrane switch.

6. The keyboard as claimed in claim 5, wherein the plural UWB flat antennas are oriented in different directions.

7. The keyboard as claimed in claim 1, wherein the first resin sheet, the second resin sheet, and the spacer resin sheet each have a protruding part protruding in an outward direction, wherein the protruding part of the first resin sheet, the second resin sheet, and the spacer resin sheet are superposed on each other.

8. The keyboard as claimed in claim 7, wherein the superposed protruding parts are bent in a direction orthogonal to the membrane switch.

9. A keyboard comprising:
   a housing including a base member and a top plane member;
   a membrane switch installed inside the housing, the membrane switch having a UWB flat antenna including an antenna element pattern, a microstrip line extending from the antenna element pattern, and a ground pattern arranged in a position facing the antenna element pattern;
   wherein the UWB flat antenna is a flexible sheet adhered to a part inside the housing;
   wherein the flexible sheet has a front surface on which the antenna element pattern and the microstrip line are formed and a rear surface on which the ground pattern is formed.

10. A membrane switch used for a keyboard having a housing into which the membrane switch is installed, the membrane switch comprising:
   a first resin sheet, a second resin sheet, and a spacer resin sheet arranged between the first and second resin sheets;
   wherein the membrane switch includes a UWB flat antenna having an antenna element pattern formed on the first resin sheet, a microwave transmission line extending from the antenna element pattern, and a ground pattern arranged in a position facing the antenna element pattern.

* * * * *